(12) United States Patent
Lutzky et al.

(10) Patent No.: US 12,342,765 B2
(45) Date of Patent: Jul. 1, 2025

(54) DRIP IRRIGATION LATERAL CONNECTOR TO FEEDER PIPE

(71) Applicant: RIVULIS PLASTRO LTD., Kibbutz Gvat (IL)

(72) Inventors: Moshe Lutzky, Kibbutz Gvat (IL); Noam Kahani, Kibbutz Gvat (IL); Zvi Golan, Kibbutz Gvat (IL); Dotan Shmueli, Kibbutz Gvat (IL); Armen Levin, Kibbutz Gvat (IL)

(73) Assignee: RIVULIS PLASTRO LTD., Kibbutz Gvat (IL)

( * ) Notice: Subject to any disclaimer, the term of this patent is extended or adjusted under 35 U.S.C. 154(b) by 0 days.

(21) Appl. No.: 18/259,056

(22) PCT Filed: Jan. 11, 2022

(86) PCT No.: PCT/IL2022/050040
§ 371 (c)(1),
(2) Date: Jun. 22, 2023

(87) PCT Pub. No.: WO2022/153296
PCT Pub. Date: Jul. 21, 2022

(65) Prior Publication Data
US 2024/0049659 A1    Feb. 15, 2024

(30) Foreign Application Priority Data

Jan. 13, 2021 (IL) .......................................... 280146

(51) Int. Cl.
*A01G 25/02*    (2006.01)
*F16L 37/00*    (2006.01)
*F16L 37/133*    (2006.01)

(52) U.S. Cl.
CPC ............ *A01G 25/02* (2013.01); *F16L 37/008* (2013.01); *F16L 37/133* (2013.01)

(58) Field of Classification Search
CPC .... A01G 25/02; A01G 25/023; A01G 25/026; F16L 37/008; F16L 37/133; F16L 37/02;
(Continued)

(56) References Cited

U.S. PATENT DOCUMENTS 4,021,061 A * 5/1977 Zimmerman ........... F16L 37/05
                                                                            285/13
4,740,017 A      4/1988   Grabowski
(Continued)

FOREIGN PATENT DOCUMENTS

DE     3235125 A1    3/1984
EP     0132419 A2    1/1985
(Continued)

*Primary Examiner* — Ebony E Evans
(74) *Attorney, Agent, or Firm* — FULLER IP LAW LLC; Rodney J. Fuller

(57) ABSTRACT

A drip irrigation lateral connector to a feeder pipe, a feeder pipe adapted for mounting those connectors and an irrigation system comprises a feeder pipe with those connectors and drip irrigation laterals that are mounted to those connectors by standard drip irrigation lateral connectors, wherein each of those connectors comprising a bushing and a sleeve element and wherein the sleeve is formed with a multi-armed circumferential array that are adapted for snap mounting of said sleeve into said bushing or disassembly from it by linearly pushing the sleeve towards the bushing or linearly retrieving the sleeve from the bushing while disconnecting the sleeve's multi-armed circumferential array from the bushing.

18 Claims, 13 Drawing Sheets

(58) Field of Classification Search
CPC . F16L 37/05; F16L 37/06; F16L 37/08; F16L 37/084; F16L 37/0841; F16L 37/0842
See application file for complete search history.

(56) References Cited

U.S. PATENT DOCUMENTS

| | | | | |
|---|---|---|---|---|
| 5,330,235 | A * | 7/1994 | Wagner | F16L 37/0985 285/423 |
| 5,897,142 | A | 4/1999 | Kulevsky | |
| 6,257,626 | B1 | 7/2001 | Campau | |
| 7,048,010 | B2 | 5/2006 | Golan | |
| 7,918,486 | B2 | 4/2011 | Gerhard | |
| 8,220,838 | B2 * | 7/2012 | Masarwa | F16L 41/088 285/200 |
| 8,240,715 | B2 * | 8/2012 | Itou | F16L 19/0237 285/354 |
| 8,672,240 | B2 | 3/2014 | Masarwa | |
| 11,274,781 | B1 * | 3/2022 | Kamerath | F16L 37/0915 |
| 2003/0062720 | A1 | 4/2003 | Anderson | |
| 2004/0150223 | A1 | 8/2004 | Campau | |
| 2005/0194469 | A1 | 9/2005 | Masarwa | |
| 2008/0012314 | A1 | 1/2008 | Harger | |
| 2016/0084420 | A1 | 3/2016 | Barrientos | |
| 2017/0205013 | A1 | 7/2017 | Smith | |
| 2018/0154561 | A1 | 6/2018 | Katzin | |
| 2023/0067922 | A1 * | 3/2023 | Kendall | A01G 27/006 |

FOREIGN PATENT DOCUMENTS

| | | | | |
|---|---|---|---|---|
| ES | 2660243 | T3 * | 3/2018 | A01G 25/02 |
| FR | 2027029 | A1 | 9/1970 | |
| GB | 1023886 | A | 3/1966 | |
| GB | 1269499 | A | 4/1972 | |
| GB | 2187662 | A | 9/1987 | |
| KR | 20080085785 | A * | 9/2008 | F16L 37/08 |
| WO | 2005057074 | A1 | 6/2005 | |
| WO | 2005084418 | A2 | 9/2005 | |
| WO | WO-2007013066 | A2 * | 2/2007 | G05D 16/106 |
| WO | 2015140676 | A1 | 9/2015 | |

* cited by examiner

DRIP IRRIGATION LATERAL CONNECTOR TO FEEDER PIPE

CROSS-REFERENCE TO RELATED APPLICATIONS

This application is the U.S. National Stage of International Patent Application No. PCT/IL2022/050040, filed on Jan. 11, 2022, which claims the benefit of and priority to Israel Patent Application No. 280146, filed on Jan. 13, 2021, the contents of each of which are hereby incorporated by reference in their entireties.

FIELD

The various embodiments described herein generally relate to the field of accessories used in agricultural irrigation applications, and particular in the field of connectors for quick connection in the field of drip irrigation laterals to the feeder pipe as branching off from it.

BACKGROUND OF THE INVENTION

In recent years, there is a growing use of irrigation systems that combine a feeder pipe with drip irrigation laterals that are mounted along the pipe as branching off from it. In the feeder pipe field, lay-flat pipes are commonly used.

A lay-flat pipe is a pipe which, when unpressurized, is substantially flat and, when pressurized by a relatively low pressure, has a substantially circular cross section. Such pipes are usually made of a flexible material and are employed in irrigation systems, as said, as manifold pipes that are each feeding an array of drip irrigation laterals.

In such systems, anchoring a drip irrigation lateral to a wall of the water supply pipe, namely to a wall of a pipe that naturally is a relatively thin wall (as the pipe that by its definition—is amenable to being flattened from the instant that a water pressure no longer prevails inside the pipe and it swells—returning to its regular (circular) pipe's shape; but from the instant of di novo (a new) increasing of the water pressure within it in repeating cycles of shape as per water pressure and so forth). Such anchoring requires a reliable connector (adapter). For an example of such a connector (adapter), see International Patent Application WO 2005/057074.

The task of forming an opening in the rather thin wall of the lay-flat pipe, and mounting over the thin edge of the pipe's wall a connector that is suited for anchoring a drip irrigating lateral with it, was found (proven) highly challenging and difficult to be performed on the spot and by farmers (agriculturists) in the field.

The prior art points to several methods and means that enable prefabrication of suitable connectors along the lay-flat pipe or at least pre-preparation of an infrastructure of brackets suitable for accommodating connectors on them and this in a manner that would make it simpler for the farmer in the field to anchor the drip irrigation laterals through them. Given an infrastructure that is ready in advance as said, along the lay-flat pipe, the farmer in the field does not have to cut proper openings in the pipe on the spot and is not required to mount a connector over the thin edge of an opening in the pipe wall as punctured and exposed by him. For example, Patent GB 2,187,662 described a lay-flat pipe with connectors to the drip irrigation laterals along its length. The connectors that were prefabricated might be assembled when forming the pipe in a manufacturing plant while Patent GB 1,023,886 described molding of a bushing in an opening formed in a thin sheet material wall.

A person skilled in the art understood that ring bushings, as learned, for example, in GB 1,023,886, if they will be pre-formed on a lay-flat pipe and form an integral part thereof, may serve as pre-prepared brackets for the insertion of drip irrigation lateral connectors, thereby saving the farmer in the field from having to form openings in the pipe and having to mount connectors over the thin edges of the opening in the pipe wall. Such integral bushings also do not impair the ability to roll the pipe in a flattened position, as is required in order to transport it to or from the field, since they are flat and do not deviate significantly from the pipe's outer circumference.

At the time of the invention that is the subject of the patent application, a range of lay-flat pipes exist and are marketed as feeder pipes in agricultural irrigation systems and are pre-formed, as early as the production stage, with an array of bushings along them. Some such bushings are prefabricated and mounted to the pipe wall, some are formed by molding on the pipe wall, and some combine pre-prepared components with molding, so that all that is left for the farmer in the field to do is to anchor the irrigation laterals to the pre-prepared bushings on the pipe using suitable connectors. For examples of patent publications disclosing lay-flat pipes with an array of bushings that are integrally mounted along them, see—U.S. Pat. No. 7,048,010 (FIG. 9), U.S. Pat. No. 8,672,240, US Patent Application Publication No. 2018/154561, EP 0132419, DE 1964860, U.S. Pat. No. 4,740,017.

A complete range of connectors is offered to farmers, which allow for communicating with the flow of water between the feeder pipe and the drip irrigation laterals and are adapted for mounting in an array of bushings pre-mounted along the lay-flat pipe. For examples of patent publications in this context see—US Patent Application Publication No. 2018/154561, International Patent Application WO 2005/084418.

However, even this task was found to be challenging to the farmer in the field. For example, since it is desirable from the outset that the bushings infrastructure will allow the farmer to use only a few bushings of his choice and according to his irrigation needs, while the rest of the bushings from which a water supply is not needed in a given scenario will remain closed and will not allow water to pass through them; since the operation of anchoring a drip irrigation lateral to the bushing performed by the farmer in the field has to be fast, easy and simple (and done manually by the farmer without having to use auxiliary accessories (work tools); since the anchoring achieved once the connector at the end of an irrigation lateral is anchored to the bushing must be efficient and reliable and in a manner that will prevent water leaks also when there is fluctuating water pressure in the pipe; disassembly of the drip irrigation lateral connector from the feeder pipe (as is required, for example, at the end of the growing season, when the feeder pipe has to be folded and stored in a rolled-up position or transported to another field), must also be quick and simple; and in addition—a clear advantage may be derived from bushings, which once the drip irrigation lateral connector is disassembled or unintentionally detached from the pipe, will have a self-closing feature and immediately seal the passage of water through it.

SUMMARY OF THE INVENTION

Aspects and embodiments are directed to a drip irrigation lateral connector to a feeder pipe. A connector according to the invention is also partly based on the technology described above in the Background of the Invention chapter for pipes used as feeder pipes in agricultural irrigation systems and that are pre-formed, even at the pipe manufacturing stage, with an array of bushings along them.

Accordingly, a connector according to the invention comprises a bushing, at least one, which is shaped in a ring-shaped configuration around the edge of an opening in the pipe wall and with a hollow stem section that protrudes outside from the pipe wall, formed at its outwardly protruding end with a ring-like surface around its circumference and comprises a passage along its length that allows the flow of water through said bushing, from inside the pipe through said hollow stem and out from it; and a sleeve element formed at one end with a bracket that is adapted for mounting a standard drip irrigation lateral connector inside it; and is formed at its other end with a passage that extends from said bracket to said other end of said sleeve element, and allows the flow of water through said sleeve; and the connector according to the invention is characterized in that said sleeve is formed with a multi-armed circumferential array that are adapted for snap mounting of said sleeve into said bushing or disassembly from it by linearly pushing said sleeve towards said bushing or linearly retrieving said sleeve from said bushing while disconnecting said multi-armed circumferential array from said bushing.

According to one embodiment, a connector according to the invention is characterized in that in the bushing in question, the hollow stem section is formed on its outer side with a circumferential recess that is spaced apart from the ring-like surface.

The outer part of the sleeve element is formed with a multi-armed circumferential array that extends along and parallel to it, each of which comprises a handle on its one side that extends parallel to the one end of the sleeve element and spaced apart from it, a protruding tongue on the other side, and a hinge means between them. Normally, the protruding tongue is stressed towards the outer surface of the sleeve element at its other end, and once the handle is pressed towards the outer surface of the sleeve element, this allows the protruding tongue to move around the hinge means, so that it moves away from the outer surface of the sleeve element. The sleeve element is additionally formed with a circumferential step formed between the hinges and the edges of the protruding tongues and with a circumferential groove that is formed between the edges of the protruding tongues and the other end of the sleeve element. The connector according to the invention also comprises a ring gasket that is adapted for mounting inside the circumferential groove.

In this embodiment of a connector according to the invention, once the sleeve element is mounted by pushing it into the passage formed in the bushing, the circumferential step of the sleeve element is stressed towards the circumferential ring-like surface at the protruding end of the hollow stem section, the array of protruding tongues then snaps into contact with the circumferential recess that is formed in the hollow stem section, and the ring gasket ensures the routing of the water flow from inside the pipe through the passage formed in the sleeve element.

In this embodiment of a connector according to the invention, the bushing is assembled and detached by moving the array of arms by pressing their handles in a motion around the hinge means until the protruding tongues are disconnected from contact with the circumferential recess, and then by pulling out said sleeve element from said passage formed in the bushing.

According to another embodiment in a connector according to the invention, once the drip irrigation lateral connector is disassembled or unintentionally detached from the pipe, it self-closes and immediately seals the passage of water through it.

In an embodiment of the invention that provides this self-closing capability, the sleeve element is formed at its other end with a circumferential ring-shaped surface, and the bushing is further characterized in that it also comprises a hollow bracket that is formed around the passage that is formed along the hollow stem and as a continuation of said passage, as a sort of stepped cup whose bottom juts outs towards the inside of the pipe, and with at least one opening on its sides to allow for the passage of water from the pipe into the bracket's cavity.

This embodiment of a connector according to the invention also comprises a springy means that is adapted for mounting inside the cavity of the bracket, wherein one end of the springy means is supported by the bracket's bottom and the other end facing the passage formed along the hollow stem.

This embodiment of a connector according to the invention additionally comprises a moving element that is formed as a sort of disc that is adapted in its dimensions to the location and linear movement within the cavity of the bracket and the passage that is formed along the hollow stem. The moving element is formed with a top surface that is adapted in its dimensions to the ring-like surface formed at the other end of the sleeve element, while leaving a flow passage in the contact area between them.

The moving element is additionally shaped with a circumferential groove, and in this embodiment of a connector according to the invention, the connector additionally comprises a ring gasket that is adapted for mounting in the circumferential groove.

The moving element is additionally formed with at least one tab, which protrudes from its bottom surface and is adapted to snap into the opening, at least one, which is formed on the sides of the hollow bracket.

The moving element is adapted for mounting inside the bracket cavity, and before the connector is mounted, the moving element is normally stressed by the springy means to come into sealing contact with the passage that is formed along the hollow stem.

In this embodiment of a connector according to the invention, once the sleeve element is mounted by pushing it inside the passage that is formed in the bushing, the circumferential ring-like surface that is formed at the other end of the sleeve element pushes the moving element, in contact with its top surface, into motion against the springy means, and the flow passage, which as stated remains on the contact surface between the circumferential ring-like surface that is formed on the other side of the sleeve element and the top surface of the moving element, then allows for the flow of water from the hollow bracket to the passage formed in the sleeve element.

In contrast, once the connector is disassembled and disconnected from the bushing, the moving element again comes in sealing contact with the passage that is formed along the hollow stem and restricts the continued passage of water from the pipe outside.

A connector according to the invention may also be embodied in other and different embodiments—as a feeder pipe that comprises an array of bushings, which are adapted for mounting connectors according to any of the connector embodiments briefly described above, or as an irrigation system that comprises a feeder pipe with connectors according to any of the connector embodiment configurations briefly described above, and drip irrigation laterals that are mounted to these connectors by standard drip irrigation lateral connectors.

Still other aspects, embodiments, and advantages of these exemplary aspects and embodiment are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE FIGURES

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION OF PREFERRED EMBODIMENT

Aspects and embodiments are directed to a drip irrigation lateral connector to a feeder pipe. It is to be appreciated that embodiments of the and apparatuses discussed herein are not limited in application to the details of construction and the arrangement of components set forth in the following description or illustrated in the accompanying figures. The devices are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
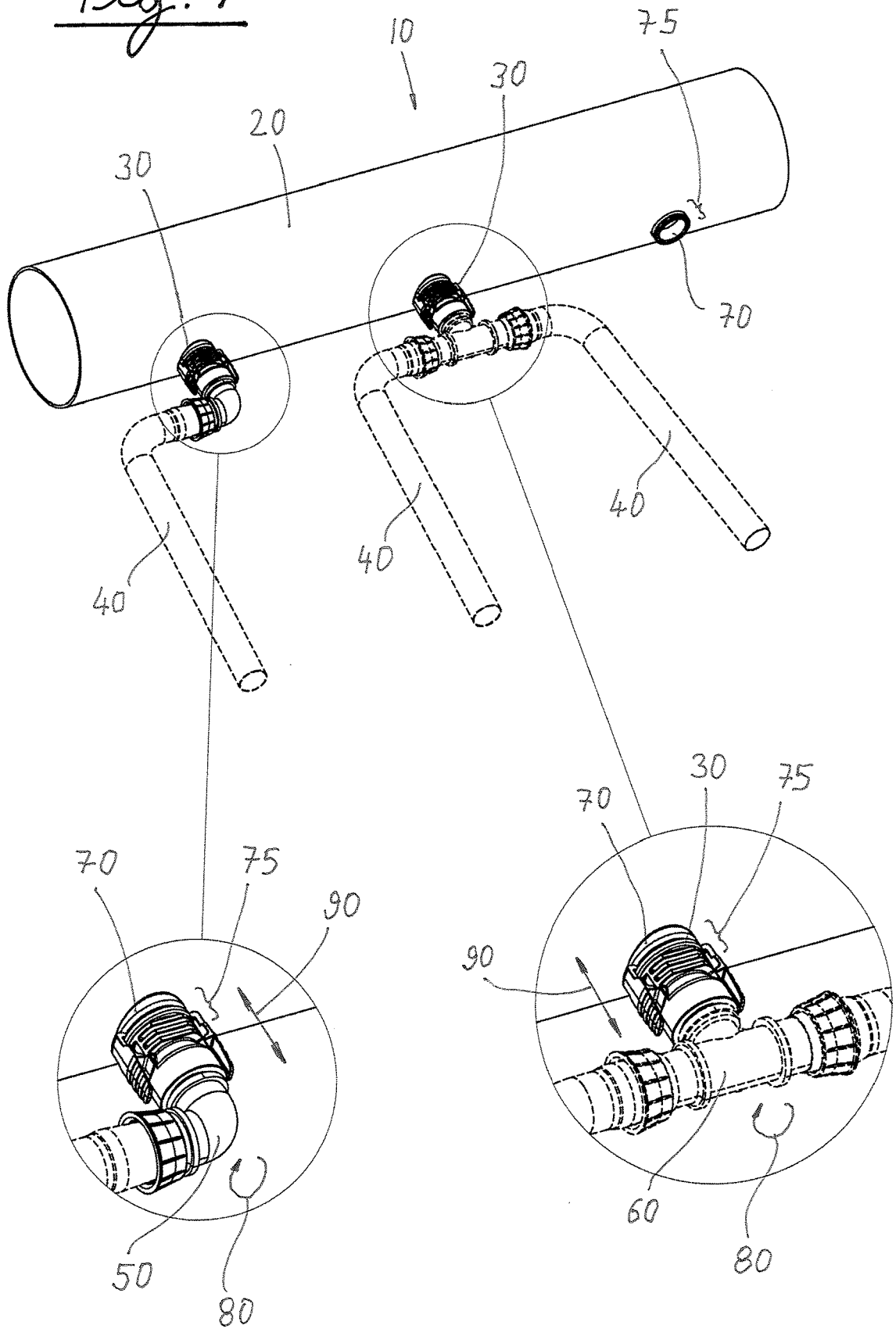
FIG. 1 is an illustration in perspective view (with enlarged parts) of irrigation system, which comprises a feeder pipe with drip irrigation lateral connectors according to the invention, and drip irrigation laterals that are mounted to the connectors by standard drip irrigation lateral connectors.

Referring to FIG. 1. FIG. 1 is an illustration in perspective view (with enlarged parts) of irrigation system 10, which comprises feeder pipe 20 with drip irrigation lateral connectors 30 according to the invention, and drip irrigation laterals 40, which according to the illustrated example, are mounted to connectors 30 by standard connectors 50, 60 of drip irrigation laterals (the drip irrigation laterals and the standard connectors are illustrated in segmented (dashed) lines).

As mentioned, connector 30 is also based in part on the technology described above in the Background of the Invention chapter with respect to pipes, such as lay-flat pipes that may be produced with multi-layered wall and are used as feeder pipes in agricultural irrigation systems. These pipes are pre-formed, still in the manufacturing phase, with an array of bushings along them.

Accordingly (and as will be described later in reference to FIGS. 2-10), in the illustrated example, feeder tube 20 is illustrated with an array of bushings 70 that is formed along its length. We should preface by stating that each of the bushings is formed in a ring-like configuration around the edge of an opening in the pipe wall and with hollow stem 75 that protrudes from the pipe wall and comprises a passage along its length, which allows for the flow of water through the bushing, from inside the pipe and out through the hollow stem.

As noted above, in accordance with the illustrated example, drip irrigation laterals 40 are mounted to connectors 30 using standard drip irrigation lateral connectors. A person skilled in the art is familiar with such standard connectors that are prevalent and commonplace accessories used by farmers in the field. For example, right angle shaped connector accessory 50, having a screw thread at one end that is adapted for screw mounting by screwing it directly into the rigid wall of a feeder pipe or to a suitable bushing formed in the pipe wall or to a connector already mounted inside, and at the other end a barbed connector is formed on which the irrigation lateral is tightly mounted. Another example is a T shaped connector accessory 60 that allows for separating laterals as illustrated.

A person skilled in the art, and especially the farmer in the field, understands that the screwing action of a standard connector accessory as needed for mounting, requires a rotary action (see arrow 80), in a way that might cause an unwanted twisting of the drip irrigation lateral if the standard connector accessory had been previously mounted to the lateral. Therefore, a person skilled in the art, and especially the farmer in the field, will appreciate the fact (as will be described later in referring to FIGS. 2-10), that in a scenario where the lateral was previously mounted to the standard connector accessory that is screwed in advance to connector 30, connector 30 enables quickly and easily mounting a drip irrigation lateral to the feeder pipe and its disassembly from it by pushing or linear retrieval (see arrow 90), which does not cause unwanted twisting of the lateral and making the work of the farmer in the field burdensome. Moreover, a skilled person, and especially the farmer in the field, will appreciate the fact that connectors 30 are adapted for using standard connector accessories that he already has on hand, thereby saving costs.

Figure 2:
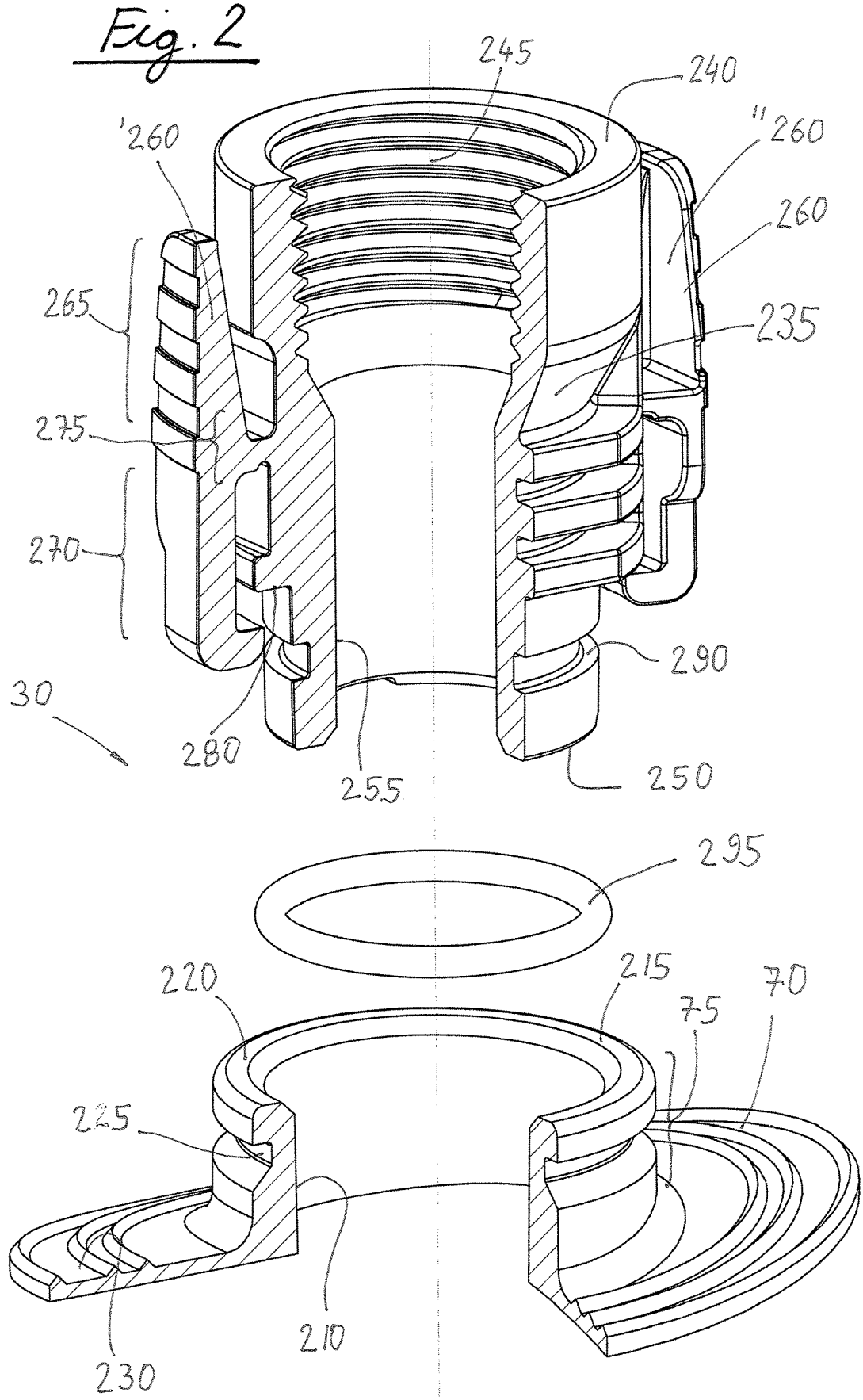
FIG. 2 depicts an exploded perspective view (in a partial cross-section) of the elements of an example of drip irrigation lateral connector according to the invention.

Referring to FIG. 2. FIG. 2 is an exploded perspective view (in a partial cross-section) depicting the elements of drip irrigation lateral 30. Connector 30 comprises bushing element 70, which as described below (in referring to FIG. 3) is formed in a ring-like configuration around the edge of an opening in the feeder pipe wall (not illustrated). Bushing 70 comprises, as mentioned, hollow stem section 75 which once the bushing is mounted protrudes from the feeder pipe wall (see above in referring to FIG. 1 and below in referring to FIG. 3). Bushing 70 comprises passage 210 running along its length. Passage 210 allows water to flow through bushing 70, from inside the pipe and outside through hollow stem 75.

Bushing 70 is characterized in that hollow stem section 75 is formed at its protruding end 215 with ring-like surface 220 around its circumference, and on its outer side with circumferential recess 225 that is spaced apart from surface 220.

Figure 3:
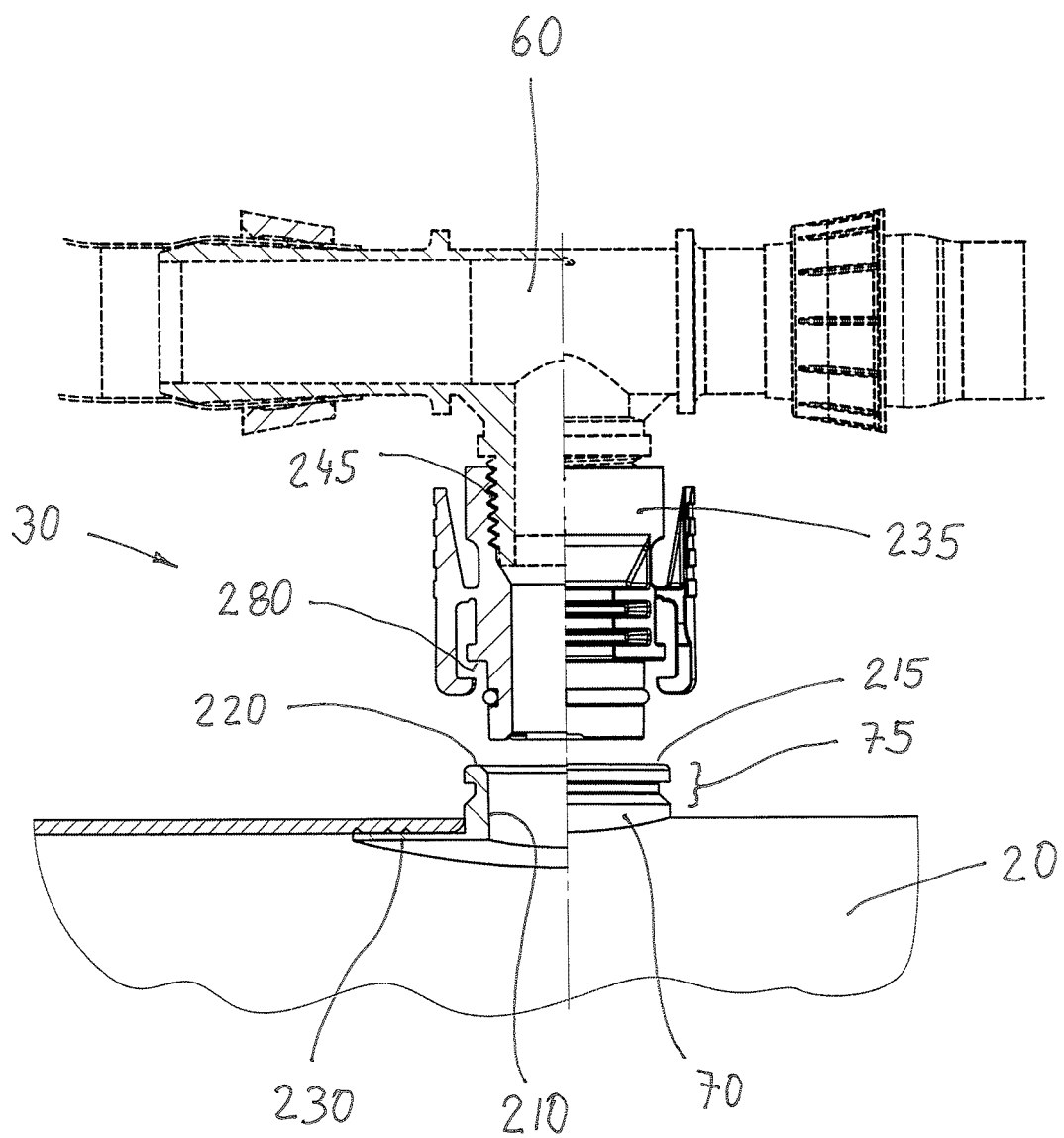
FIG. 3 depicts in a semi-cross-sectional view—semi-view, the example of a drip irrigation lateral connector according to the invention, whose elements are illustrated in FIG. 2, at the stage before the sleeve element is mounted by pushing it inside the bushing.

According to the illustrated example, bushing 70 is formed with surface 230, which once the bushing is mounted, is fixed to the inner wall of the feeder pipe (see below in referring to FIG. 3). Surface 230 is formed according to the illustrated example as a sort of ellipse, which once the bushing is mounted to the inner wall of the pipe, its length dimension extends parallel to the length dimension of the feeder pipe and in a way that facilitates changing the pipe dimensions (a change that occurs if the pipe in question is a lay-flat pipe). At the same time, a skilled person will understand that bushing 70 may be in a ring-like configuration with no surface or another form of surface.

In light of the prior art cited above in the Background of the Invention chapter, a skilled person will understand that bushing 70 may be made of a polymeric material by injection molding on the wall of the feeder pipe or as a pre-prepared part that is fixed to the pipe wall (e.g., by gluing, welding or ultrasonic welding). Bushing 70 may also be formed from a combination of a pre-prepared part with a part that is formed by injection molding to take place on the pipe, wherein the formation of the latter by injection molding connects them together and both to the pipe wall.

Connector 30 also comprises sleeve element 235. On its inner side, sleeve element 235 is formed at one end 240 with bracket 245, which is adapted for mounting a standard drip irrigation lateral connector inside it (see above in referring to FIG. 1). According to the illustrated example, this is an internal threaded section, but a person skilled in the art will understand that the bracket may be formed in other and different configurations (e.g., as an external threaded section, as a tooth connector, etc.). Sleeve 235 is formed at its other end 250 with passage 255, which extends along its length from bracket 245 to other end 250.

On the outer side, sleeve element 235 is formed with multi-armed circumferential array 260 (two—'260 and "260 are according to the illustrated example). According to the illustrated example, pair of arms '260 and "260 extend along the length of sleeve 235 and parallel to it, wherein they are disposed opposite each other on either side of sleeve element 235.

Each of arms '260 and "260 comprises a handle on one side, which extends parallel to one end 240 of sleeve 235 and spaced apart from it, protruding tongue 270 on the other side, and hinge means 275 between them. Protruding tongue 270 is normally stressed toward the outer surface of sleeve element 235 at its other end 250. When handle 265 is pressed towards the outer surface of sleeve 235, this enables protruding tongue 270 to move around hinge means 275, in such a way that it moves away from the outer surface of sleeve 235.

As mentioned, according to the illustrated example, multi-armed circumferential array 260 consists of two arms that are disposed opposite each other on both sides of the sleeve element, but a skilled person will understand that the array could consist of another plurality of arms. According to the illustrated example, hinge means 275 is a living hinge (integral hinge), which is formed as a unified, integral part with the sleeve element, but a skilled person will understand that the hinge means may be in a bracket configuration with a hinge inside, wherein the handle element with the protruding tongue is mounted on the hinge and stressed using a spring coil (e.g., twist spring).

On the outside, sleeve element 235 is also formed with circumferential step 280, which is formed between hinge means 275 and the ends of protruding tongues 270, and with a circumferential groove 290 that is formed between hinge means 275 and the other end 250 of the sleeve.

A skilled person will understand that sleeve element 235 may be made by injection molding of a polymeric material as a unified, integral part thereof according to the illustrated configuration, hinge means 275 is a living hinge that is formed as a unified, integral part with the sleeve element or as an assembly—as an element to which hinges, arm elements with a protruding tongue and spring coils are added and assembled on it Connector 30 also comprises ring gasket 295 that is adapted for mounting inside circumferential groove 290. According to the illustrated example, gasket 295 is an elastomeric O-ring.

Figure 4:
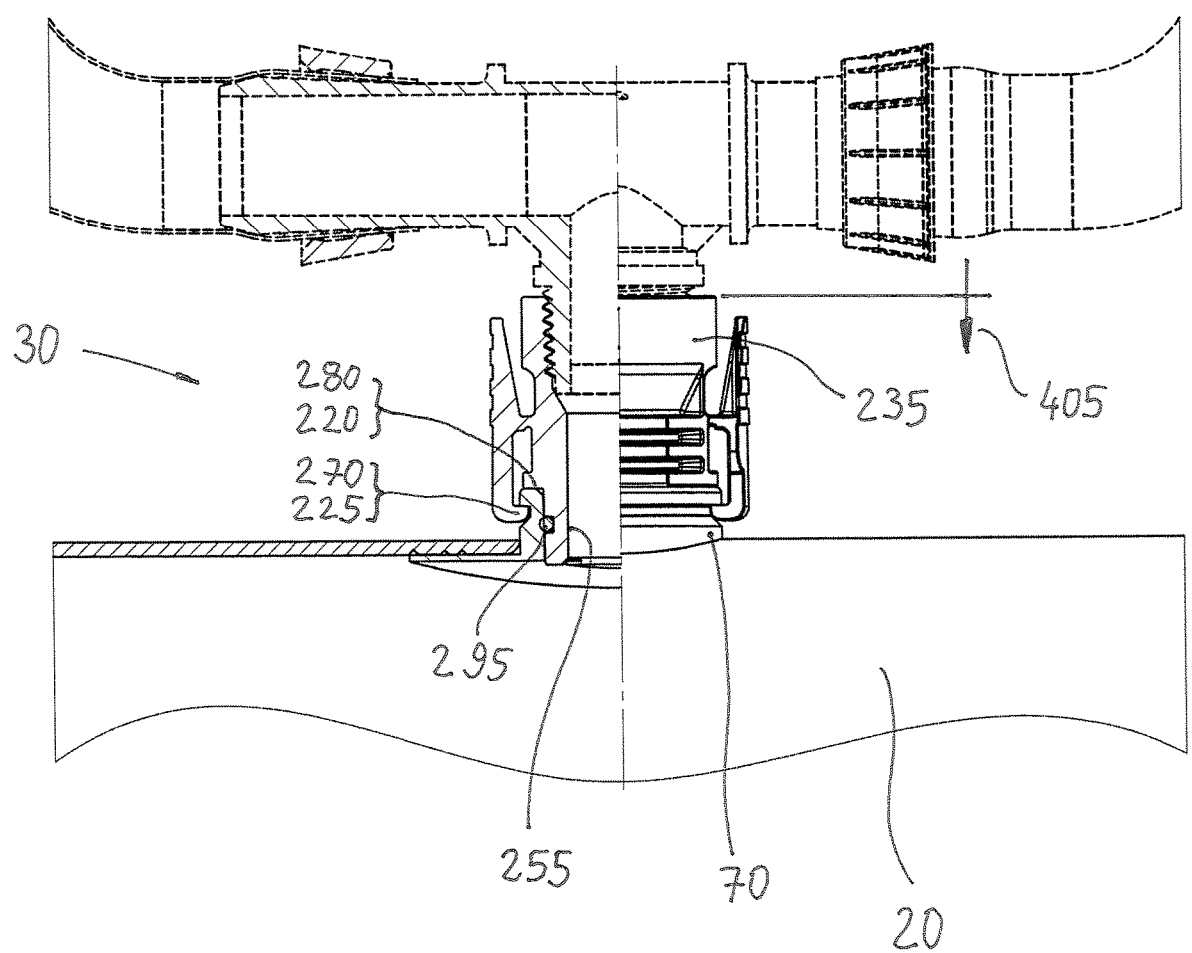
FIG. 4 depicts in a semi-cross-sectional view—semi-view, the example of a drip irrigation lateral connector according to the invention, whose elements are illustrated in FIG. 2, at the stage after the sleeve element is mounted by pushing it inside the bushing.
Figure 5:
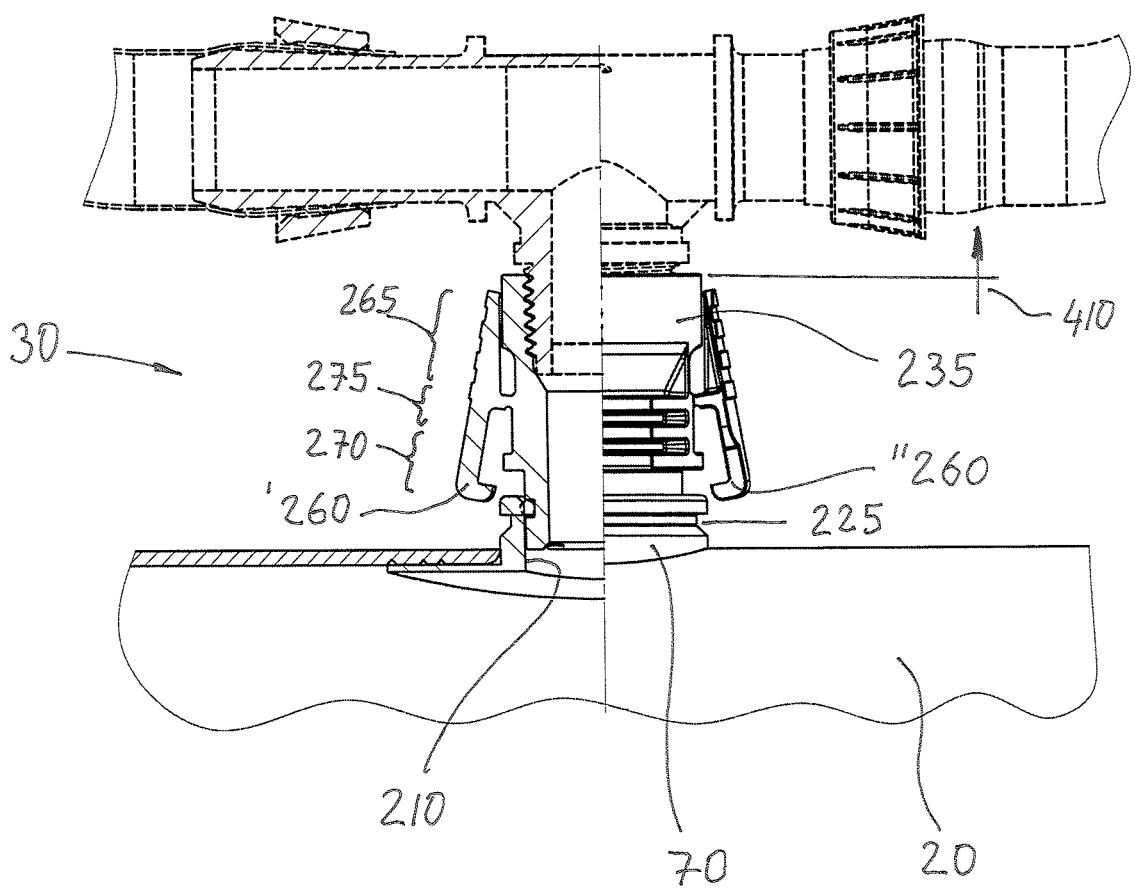
FIG. 5 depicts in a semi-cross-sectional view—semi-view, the example of a drip irrigation lateral connector according to the invention, whose elements are illustrated in FIG. 2, at the stage of disassembling and disconnecting the connector by pulling the sleeve element out of the bushing.

The mode of operation of connector 30 is explained below in referring to FIGS. 3-5. FIG. 3 depicts a semi-cross-sectional view—semi-view of connector 30 at the pre-mounting phase of sleeve element 235 by pushing it into bushing 70. FIG. 4 depicts a semi-cross-sectional view—semi-view of connector 30 at the post-mounting phase of sleeve element 235 (following the pushing of sleeve 235 into bushing 70). FIG. 5 is a semi-cross-sectional view—semi-view of connector 30 at the phase of disassembly and detachment of sleeve element 235 from bushing 70. The drip irrigation laterals and the standard connector are illustrated with segmented (dashed) lines.

Prior to mounting (see FIG. 3), feeder hose 20 is disposed with bushings array 70 already formed along its length. According to the illustrated example, bushing 70 is formed from a polymeric material by injection molding on the feeder pipe wall or as a pre-prepared part that is fixed to the pipe (e.g., by gluing, thermal welding or ultrasonic welding). Surface 230 of bushing 70 is fixed to the inner wall of the pipe with hollow section 75 protruding outward from the pipe surface. The farmer who wants to attach irrigation laterals to the pipe, mounts a standard connector, according to the illustrated example—connector T 60 to sleeve element 235 by screwing the standard connector accessory to bracket 245, and afterwards harnesses the irrigation laterals to the standard connector accessory (the irrigation laterals and the standard connector accessory are illustrated with a segmented line).

In this mode, the mounting of connector 30 (see FIG. 4) requires the farmer only for a linearly push (see arrow 405) of sleeve element 235 into passage 210 that is formed in bushing 70. This push-in action causes circumferential step 280 of sleeve element 235 to be stressed towards circumferential ring-like surface 220 formed at the protruding end 215 of hollow stem section 75. At the same time, protruding tongues array 270 are snapped into contact with circumferential recess 225 formed in hollow stem section 75.

Thus, the mounting of connector 30 is completed by a slight push-in action, and any water flowing in the feeder pipe will be routed towards the irrigation laterals, with ring gasket 295 ensuring that the water flow is routed from inside the pipe through passage 255 formed in sleeve 235 (therefore, a slight longitudinal movement of the sleeve in relation to the bushing as a result of tolerances, if occurred in the connector, will not cause a leak).

When the farmer wishes to disassemble the irrigation lateral from the feeder pipe (see FIG. 5), then the disassembly of connector 30 and its detachment from bushing 70 requires the farmer to move arms array 260, by manually pressing on handles 265 into motion around hinge means 275 until protruding tongues 270 disconnect from contact with circumferential recess 225, and then to pull sleeve element 235 out of passage 210 that is formed in bushing 70 (see arrow 410).

The configuration of bushing 70 enables in normal mode for water to flow out of the inside of the pipe. However, there are situations where the farmer does not require using all the bushings available to him along the pipe by mounting connectors 30 in all of them.

Figure 6:
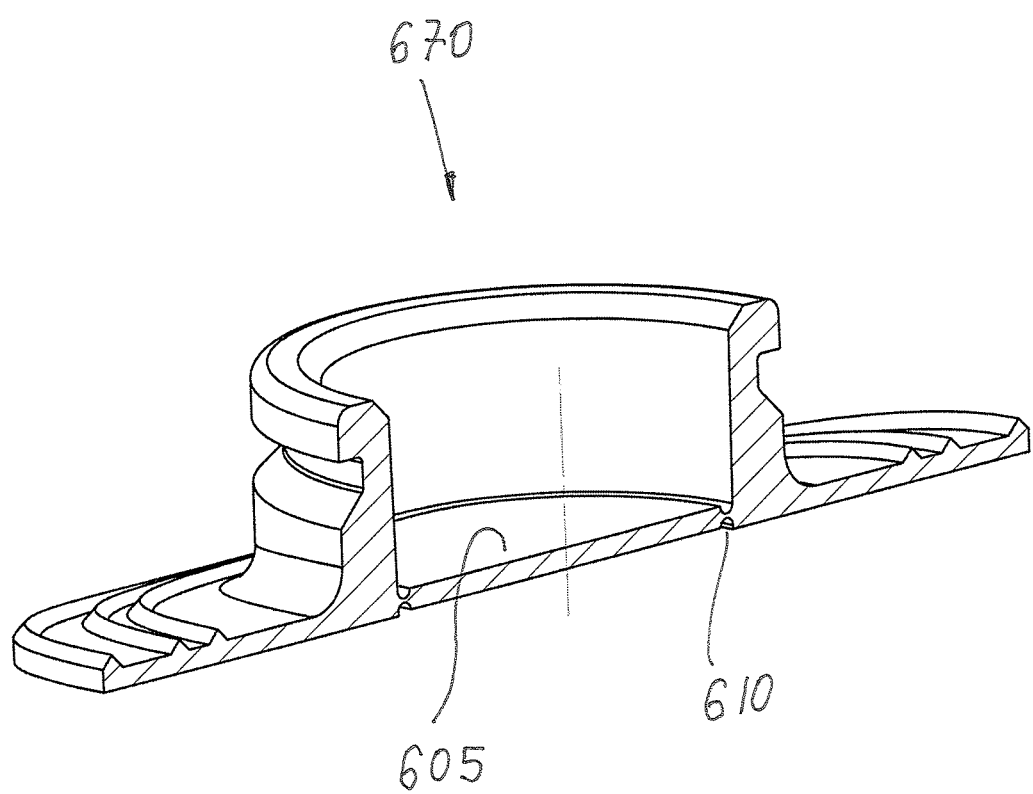
FIG. 6 is a cross-sectional perspective view of an embodiment of a bushing element with a removable cover.

In referring to FIG. 6. FIG. 6 is a cross-sectional perspective view of an embodiment of bushing element 670 with a removable cover 605. Bushing 670 is additionally formed with removable cover 605, which, prior to the removal and assembly of a connector according to the invention, prevents water from flowing through bushing 670.

According to the illustrated example, removable cover 605 is formed as a unified, integral part with the bushing and in a configuration of a cover that can be opened and removed on the spot by the farmer (while taking advantage of circumferential weakening groove 610 formed around the cover). However, a person skilled in the art would understand that preventing the flow of water from bushings before mounting a connector by means thereof, and thereby enabling the farmer to use only part of the full array of bushings available to him, may also be possible using other means (e.g., by adding removable plugs and mounting them in each of the bushings by the farmer or at the factory that makes the feeder pipe).

The embodiment of bushing 670 prevents the passage of water flowing out from the inside of the pipe before removing removable cover 605. However, there are situations in which the farmer wishes to disassemble part of the drip irrigation laterals from the feeder pipe and by doing so disconnect them from their water supply (e.g., in order to replace a worn-out lateral) or when the drip irrigation lateral connector is unintentionally detached from the feeder pipe. In such scenarios, there may be an unnecessary leakage of water from inside the feeder pipe.

Figure 7:
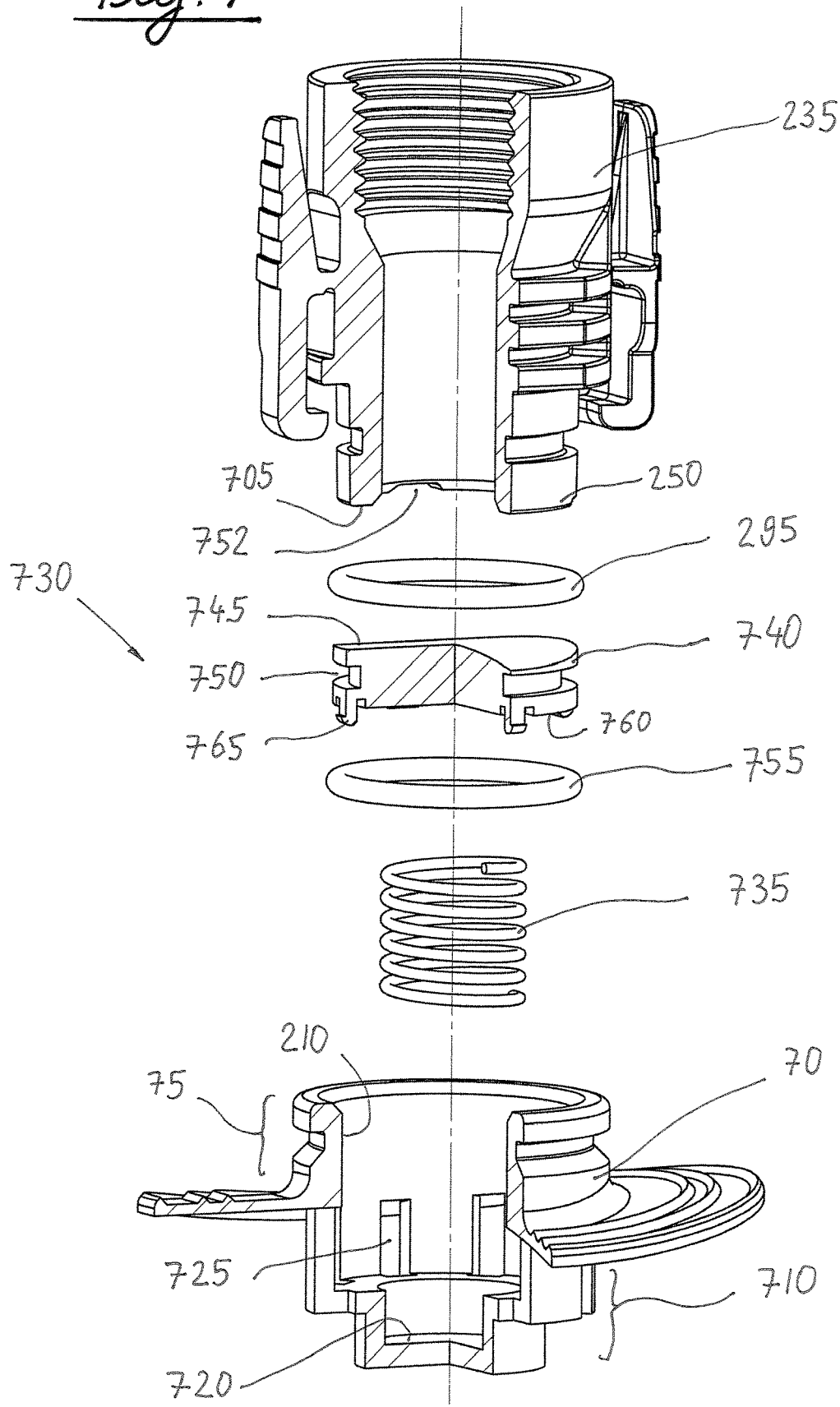
FIG. 7 depicts an exploded perspective view (in a partial cross-section) of the elements of an example of another embodiment of a drip irrigation lateral connector according to the invention, which upon disassembly or unintentional disconnection of the connector from the pipe, self-closes and immediately seals the passage of water through it.

In referring to FIG. 7. FIG. 7 depicts an exploded perspective view (partial cross-section) of elements of an example of another embodiment of a drip irrigation lateral connector according to the invention, which once the drip irrigation lateral connector is disassembled or unintentionally detached from the pipe, allows for it to self-close and immediately seal off the passage of water through it.

Connector 730 is a variation of connector 30, as described above in referring to FIGS. 2-5, and may also be combined in bushing configuration 670 as described above in referring to FIG. 7.

Connector 730 has sleeve element 235 formed at the other end 250 with a ring-like surface 705 around its circumference.

Bushing 70 in connector 730 is further characterized in that it additionally comprises hollow bracket 710, which is formed around passage 210 that is formed along hollow stem 75 and as a continuation of said passage.

According to the illustrated example, hollow bracket 710 is formed as a kind of stepped cup whose bottom 720 protrudes towards the inside of the pipe (not illustrated), and with at least one opening 725 on its sides (according to the illustrated example—multi-opening circumferential array 725). Once bushing 70 is mounted in the pipe, opening 725 allows for water to flow from inside the pipe into the internal cavity of hollow bracket 710.

According to the illustrated example, hollow bracket 710 is formed as a unified, integral part together with bushing 70, which is formed by injection molding, but a skilled person will understand that hollow bracket 710 may also be formed as a separate, pre-prepared part that is mounted on bushing 70 (e.g., by ultrasonic welding or by means of a thread connector).

Bushing 70 in connector 730 also comprises springy means 735. Springy means 735 is adapted for mounting inside the cavity of bracket 710, with one end supported at its bottom 720 and the other end facing passage 210 that is formed along hollow stem 75.

According to the illustrated example, springy means 735 is a spiral spring, but a skilled person will understand that springy means may also implemented through other types of springs (for example—an array of Belleville disc springs).

Bushing 70 in connector 730 also comprises moving element 740. Moving element 740 is formed as a sort of disc, which is adapted in its dimensions to the location and linear movement inside the cavity of bracket 710 and passage 210 that is formed along the length of hollow stem 75.

Moving element 740 is formed with top surface 745. Surface 745 is adapted in its dimensions to circumferential ring-like surface 705, which is formed at the other end 250 of sleeve element 235, but while allowing a flow passage in the contact area between them.

According to the illustrated example, passage 752 which remains in the contact area between surface 745 of moving element 740 and circumferential ring-like surface 705, which is formed at the other end 250 of sleeve element 235, is formed by forming the other circumferential ring-like surface of the sleeve element with an undulating configuration or with an array of circumferential openings, thereby allowing contact between them on the one hand and leaving a flow passage once there is contact between them. However, a skilled person will understand that leaving a flow passage, as required, can also be achieved by forming the surface of the moving element surface with an undulating configuration. Similarly, leaving a flow passage, as required, may also be achieved by forming openings in a configuration that is not necessarily undulating (e.g., by forming a circumferential sequence of protrusions and recesses in any of them or in both).

Moving element 740 is additionally formed with circumferential groove 750.

Connector 730 also comprises ring gasket 755 that is adapted for mounting inside circumferential groove 750. According to the illustrated example, gasket 755 is an elastomeric O-ring.

Moving element 740 is additionally formed with bottom surface 760 from which a circumferential array of tabs 765 protrudes. Once moving element 740 is mounted in bracket 710, tabs 765 are snapped into multi-opening circumferential array 725, and are adapted to move in a linear motion along the openings. Therefore, not only that the flexibility of tabs 765 (as a snap type of connection) enable the assembly of moving element 740 inside hollow bracket 710 through passage 210 that is formed in bushing 70, but also the range of the linear movement of moving element 740 under the springy means 735 force is restricted.

Figure 8:
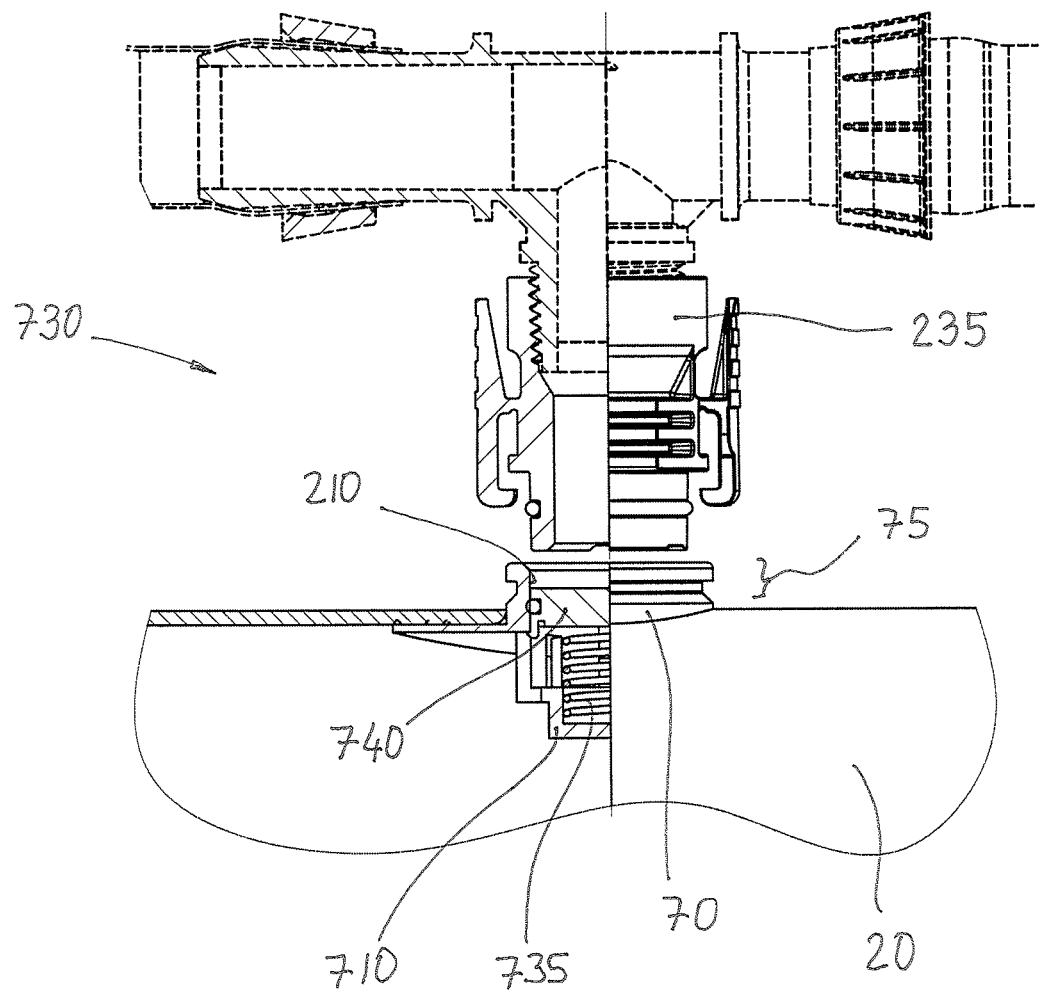
FIG. 8 depicts a semi-cross-sectional view—semi-view of an example of a drip irrigation lateral connector according to the invention, whose elements are illustrated in FIG. 7, at the phase before the sleeve element is mounted by pushing it inside the bushing.
Figure 9:
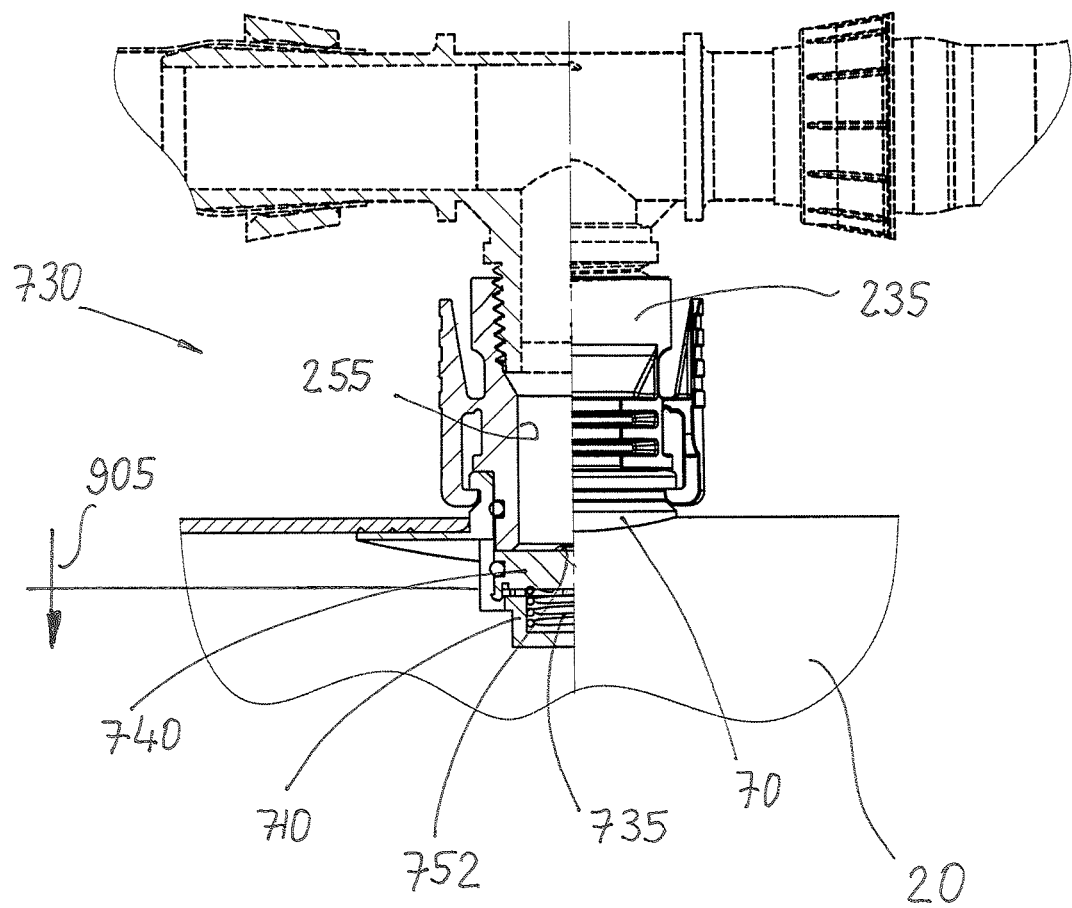
FIG. 9 depicts a semi-cross-sectional view—semi-view of an example of a drip irrigation lateral connector according to the invention, whose elements are illustrated in FIG. 7, at the phase after the sleeve element is mounted by pushing it inside the bushing.
Figure 10:
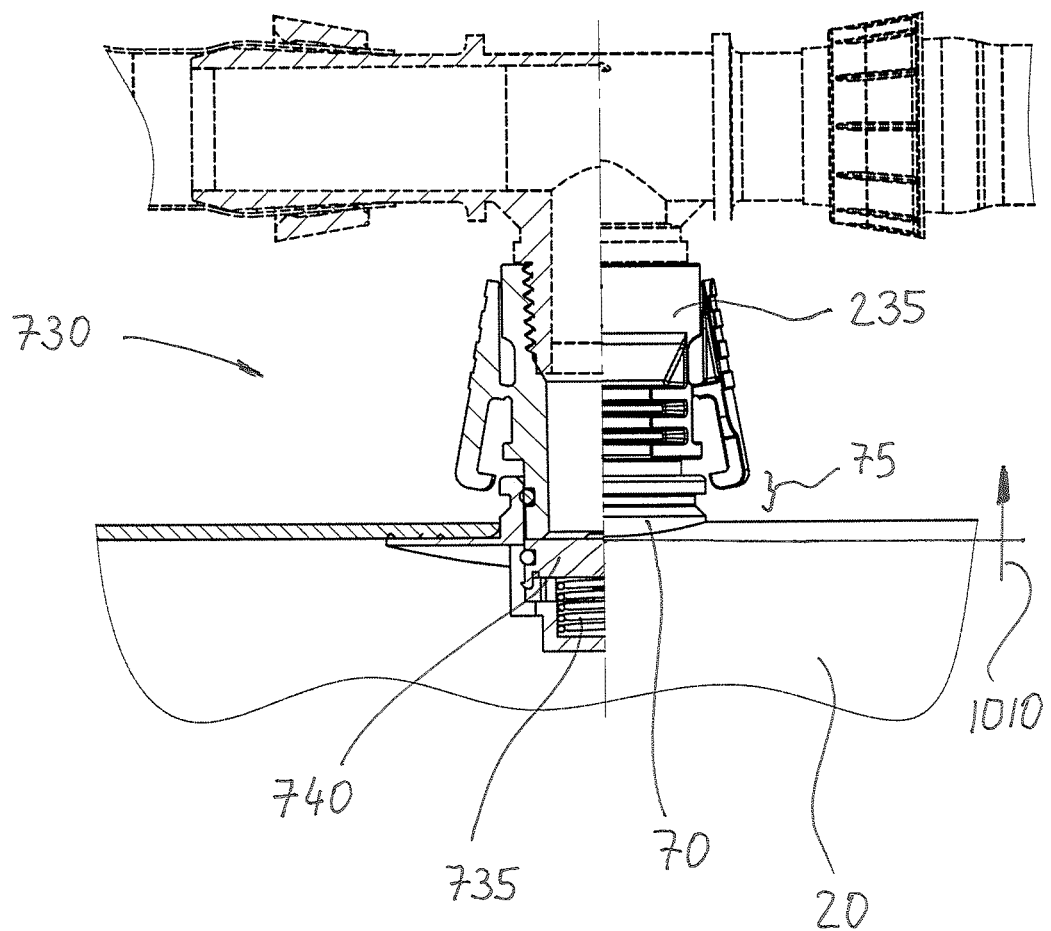
FIG. 10 depicts a semi-cross-sectional view—semi-view of an example of a drip irrigation lateral connector according to the invention, whose elements are illustrated in FIG. 7, at the stage of disassembling and disconnecting the connector by pulling the sleeve element out of the bushing.

The mode of action of connector 730 is explained below in referring to FIGS. 8-10. FIG. 8 depicts a semi-cross-sectional view—semi-view of example connector 730 at the pre-mounting phase of sleeve element 235 by pushing it into bushing 70. FIG. 9 depicts a semi-cross-sectional view—semi-view of connector 730 at the post-mounting phase of sleeve element 235 by pushing it into bushing 70. FIG. 10 is a semi-cross-sectional view—semi-view of connector 730 at the phase of disassembly and detachment of sleeve element 235 from bushing 70. The drip irrigation laterals and the standard connector are illustrated with segmented lines.

Prior to mounting connector 730 (see FIG. 8), moving element 740, which is disposed inside the cavity of bracket 710, is normally stressed (before mounting the connector) by springy means 735 for sealing contact with passage 210, which is formed along hollow stem 75. That is, normally and as long as the connector has not been mounted, water does not flow out from the pipe.

In mounting connector 730 (see FIG. 9), by mounting sleeve element 235 by way of pushing it into passage 210 that is formed in bushing 70—circumferential ring-like surface 705, which is formed at the other end 250 of sleeve element 235, pushes moving element 740 into motion (in the direction of arrow 905) against springy means 735.

In this mode, passage 752 which, as stated, remains on the contact surface between circumferential ring-like surface 705 that is formed at the other end 250 of sleeve element 235 and the moving element, then allows for the flow of water from hollow bracket 710 to passage 255 formed in sleeve element 235. In other words, once connector 730 is mounted in the pipe, this allows for the flow of water from the pipe to the drip irrigation laterals.

When the farmer wishes to disassemble the irrigation laterals from the feeder pipe (see FIG. 10), then disassembling connector 730 and disconnecting it from bushing 70, leads to distancing sleeve element 235 from the bushing and opens the way for moving element 740 to move again due to springy means 735 force (in the direction of arrow 1010) and to re-establish sealing contact with passage 210 that is formed along hollow stem 75. The sealing contact restricts the continued passage of water out from the pipe.

That is, implementing the embodiment of connector—730 according to the invention, gives the feeder pipe a normally closed ability that is reversible and applies to each of the bushings that are mounted as an array along it, whether said connector was mounted in any of the bushings with a drip irrigation lateral connected to it and later removed, or whether the bushing was never used.

Figure 11:
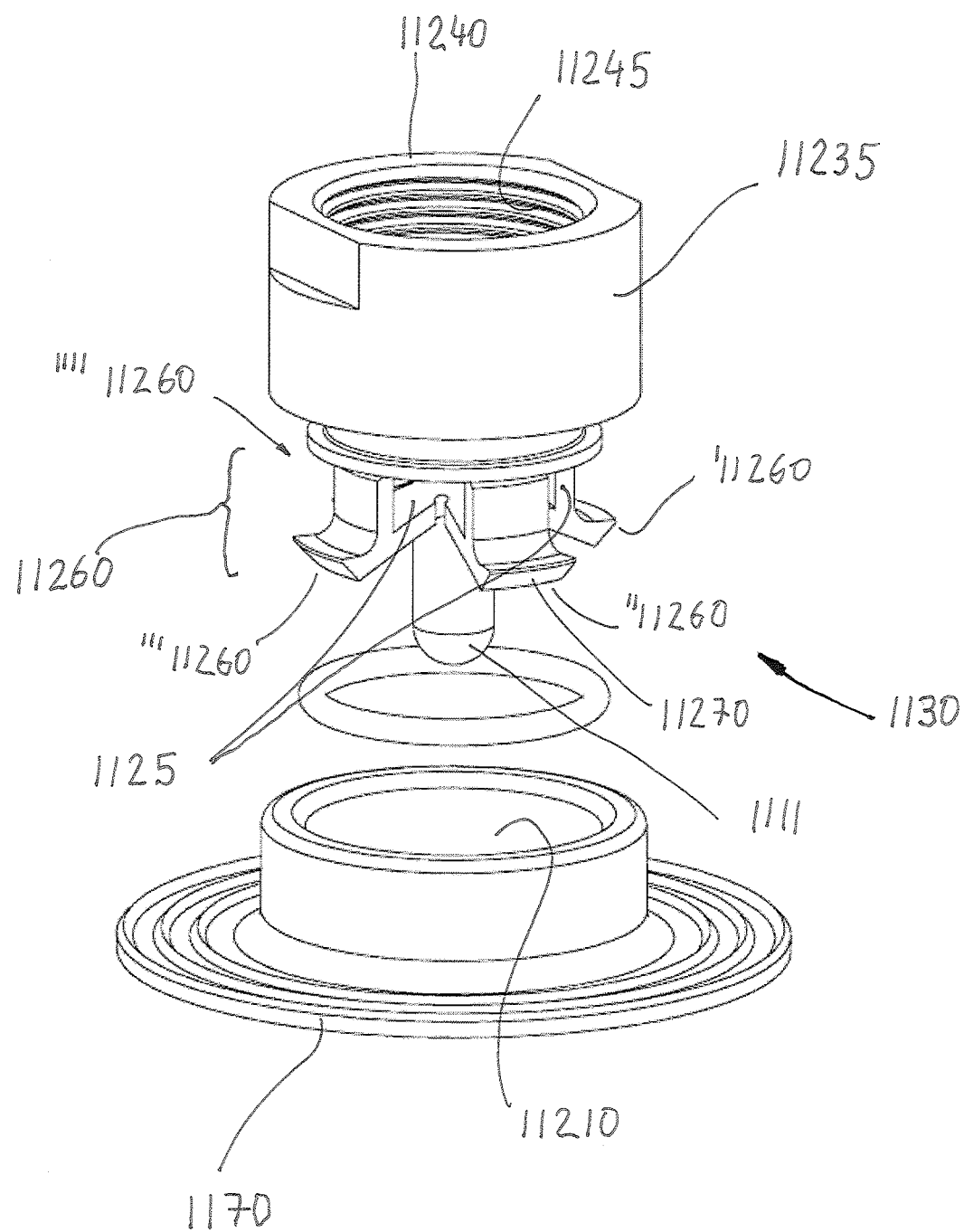
FIG. 11 depicts an exploded perspective view of the elements of an example of another embodiment of a drip irrigation lateral connector according to the invention, wherein the multi-armed circumferential array that are adapted for snap mounting of the sleeve into the bushing are formed at the bottom section of the sleeve.
Figure 12:
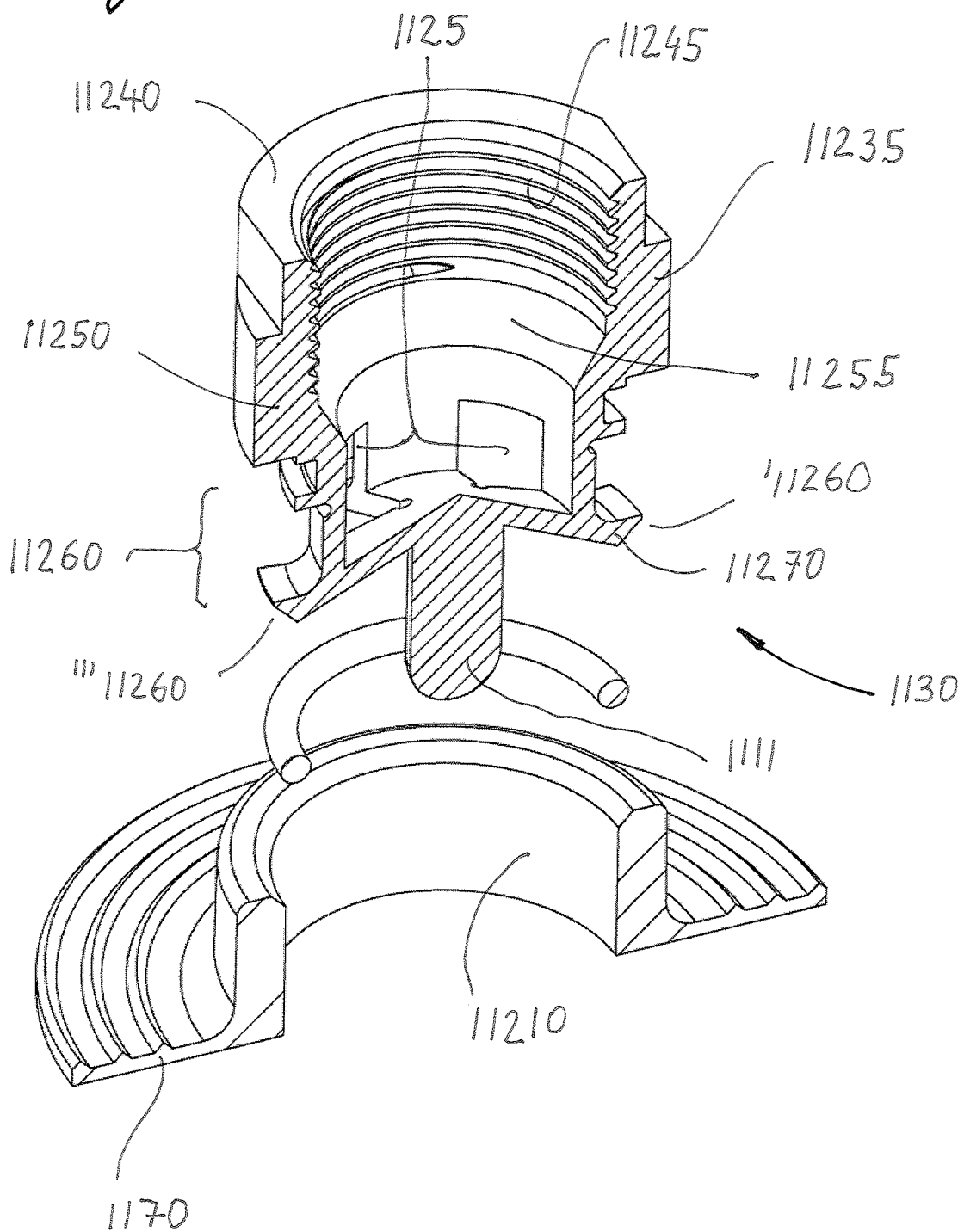
FIG. 12 depicts an exploded perspective view (in a partial cross-section) of the elements of an example of drip irrigation lateral connector according to the invention, whose elements are illustrated in FIG. 11.

Referring to FIG. 11 and FIG. 12, FIG. 11 depicts an exploded perspective view of the elements of an example of another embodiment of a drip irrigation lateral connector 1130 according to the invention, wherein the multi-armed circumferential array 11260 that are adapted for snap mounting of the sleeve 11235 into the bushing 1170 are formed at the bottom section of the sleeve. FIG. 12 depicts an exploded perspective view (in a partial cross-section) of the elements of drip irrigation lateral connector 1130.

Connector 1130 comprises sleeve element 11235. On its inner side, sleeve element 11235 is formed at one end 11240 with bracket 11245, which is adapted for mounting a standard drip irrigation lateral connector inside it (see above in referring to FIG. 1). According to the illustrated example, this is an internal threaded section, but a person skilled in the art will understand that the bracket may be formed in other and different configurations (e.g., as an external threaded section, as a tooth connector, etc.). Sleeve 11235 is formed at its other end 11250 with passage 11255, which extends along its length from bracket 11245 to other end 11250.

On the bottom section, sleeve element 11235 is formed with multi-armed circumferential array 11260 (four according to the illustrated example). According to the illustrated example, four arms ('11260 to ""11260) are circumferentially extend from the bottom of sleeve 11235. Each of the four arms ('11260 to ""11260) is formed with protruding tongue 11270 on the other side. A multi-opening circumferential array 1125 is formed above multi-armed circumferential array 11260, providing for water passage between passage 11210 of bushing 1170 and passage 11255 of sleeve 11235. The multi-armed circumferential array 11260 is combined in the middle by a pushing knob 1111 that is integrally formed with sleeve 11235 while protruding from its bottom.

Figure 13:
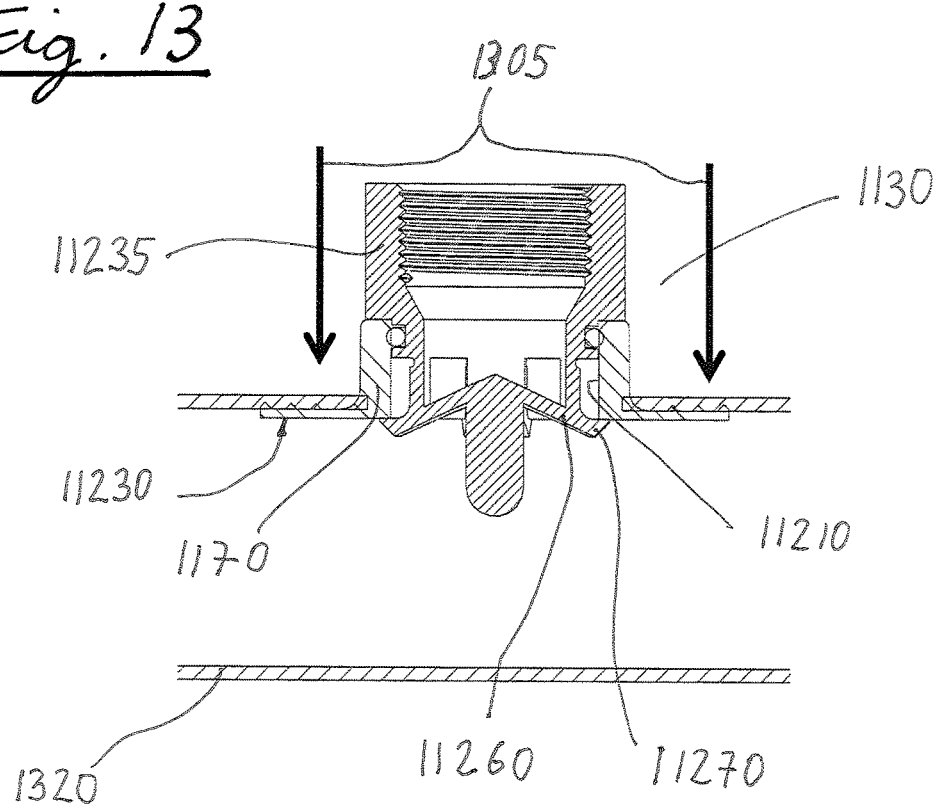
FIG. 13 depicts in a cross-sectional view, the example of a drip irrigation lateral connector according to the invention, whose elements are illustrated in FIG. 11, at the stage after the sleeve element is mounted by pushing it inside the bushing.
Figure 14:
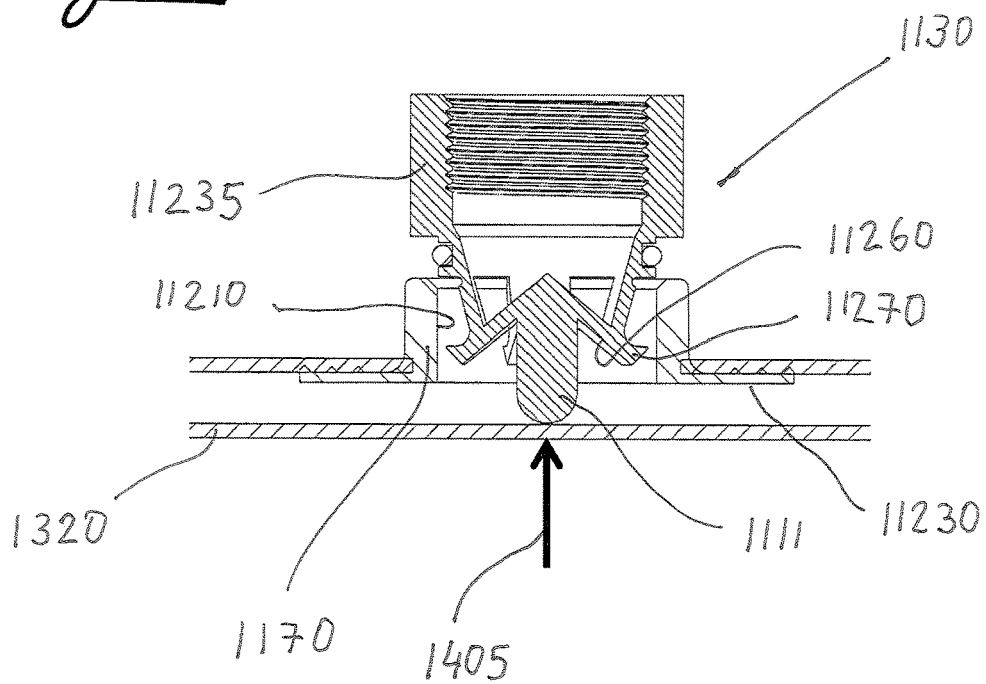
FIG. 14 depicts in a cross-sectional view an example of a drip irrigation lateral connector according to the invention, whose elements are illustrated in FIG. 11, at the stage of disassembling and disconnecting the connector by pulling the sleeve element out of the bushing.

Referring to FIG. 13 and FIG. 14, FIG. 13 depicts in a cross-sectional view, drip irrigation lateral connector 1130, at the stage after sleeve element 11235 is mounted by pushing it inside bushing 1170. FIG. 14 depicts in a cross-sectional view, drip irrigation lateral connector 1130, at the stage of disassembling and disconnecting the connector by pulling sleeve element 11235 out of bushing 1170.

The mounting of connector 1130 requires the farmer only for a linearly push (see arrows 1305) of sleeve element 11235 into passage 11210 that is formed in bushing 1170. This push-in action causes protruding tongues 11270 of multi-armed circumferential array 11260 to engage the walls of passage 11210 of bushing 1170 and then to snapped into contact (as illustrated in FIG. 13) with the bottom surface 11230 of bushing 1170.

When the farmer wishes to disassemble the irrigation lateral from the feeder pipe (see FIG. 14), then the disassembly of connector 1130 and its detachment from bushing 1170 requires the farmer to manually feel, from the outside of feeder pipe 1320, pushing knob 1111, and then to push it (see arrow 1405). By manually pressing on pushing knob 1111, multi-armed circumferential array 11260 is elastically deflected (as illustrated) while disconnecting protruding tongues 11270 of multi-armed circumferential array 11260 from bottom surface 11230 of bushing 1170, and then what left is only to pull sleeve element 11235 out of passage 11210 that is formed in bushing 1170 (in a linear movement in the direction of arrow 1405).

Therefore, in light of the above description, in referring to the accompanying figures, a person skilled in the art would appreciate the fact that a drip irrigation lateral connector to a feeder pipe according to the invention provides an appropriate solution to challenges faced by the farmer in the field that were not met by the prior art (see and compare to the Background of the Invention chapter).

The infrastructure of bushings of connectors according to the invention enables the farmer to use only the ones he chooses and according to his irrigation needs, while the rest of the bushings from which a water supply is not needed in a given scenario (insofar as bushing 670 or connector 730 is concerned) will remain closed and will restrict the passage of water through them; and The action of anchoring the drip irrigation lateral to the bushing that the farmer in the field is required to do is quick, easy and simple (and can be done manually and without requiring auxiliary accessories (work tools)—by manually pushing sleeve element (235, 11235) in a linear motion into the bushing); and The anchoring achieved, once a connector according to the invention is anchored to a bushing, is efficient and reliable in a manner that prevents water leaks also in scenarios of fluctuating water pressure in the pipe; and Disassembly of the drip irrigation lateral from the feeder pipe (as is required, for example, at the end of the growing season, when the feeder pipe has to be folded and stored in a rolled-up position or transported to another field) is also quick and simple (by manually pressing handles 265 and retrieving sleeve element 235 from the bushing in a linear motion or in another embodiment, by pushing knob 1111 and retrieving sleeve element 11235 from the bushing in a linear motion); and in addition—

Connector 730 allows for disassembling or in the case of the unintentional detachment of the connector from the pipe without fear of further water flowing out of the pipe, since the connector has a feature of self-closing and immediately sealing off the passage of water through it.

While the Applicant's teachings are described herein in conjunction with various embodiments for illustrative purposes, it is not intended that the Applicant's teachings be limited to such embodiments. On the contrary, the Applicant's teachings described and illustrated herein encompass various alternatives, modifications, and equivalents, without departing from the embodiments, the general scope of which is defined in the appended claims—

The invention claimed is:

1. A drip irrigation lateral connector to a feeder pipe comprising
   a bushing, at least one, which is shaped in a ring-shaped configuration around an edge of an opening in a pipe wall and with a hollow stem section that protrudes outside from the pipe wall, formed with an annular surface around a circumference of an end of the hollow stem section distal to the pipe wall and comprises a passage along a length of the hollow stem section that allows a flow of water through said bushing, from inside the pipe through said hollow stem and out from said hollow stem; and
   a sleeve element formed at one end with a bracket that is adapted for mounting a standard drip irrigation lateral connector inside the sleeve element; with the sleeve element comprising a passage that extends from said bracket to an opposite end of said sleeve element, the passage allowing the flow of water through said sleeve; and
   said connector is characterized in that said sleeve is formed with a multi-armed circumferential array that are adapted for snap mounting of said sleeve into said bushing by linearly pushing said sleeve towards said bushing, and also adapted for disassembly of said sleeve from said bushing by linearly retrieving said sleeve from said bushing while disconnecting said multi-armed circumferential array from said bushing.

2. The connector according to claim 1, wherein said bushing is characterized in that said hollow stem section is formed with a circumferential recess on an outer side of the hollow stem, with the circumferential recess spaced apart from said annular surface; and wherein said sleeve element is formed with said multi-armed circumferential array on an outer surface of the sleeve element, the multi-armed circumferential array comprising a plurality of arms, wherein each arm of said arms extends along and parallel to it the sleeve element and comprises a handle on one side that extends parallel to said one end of said sleeve element and at a distance from said one end of the sleeve element, a protruding tongue opposite the handle, and a hinge means between the handle and the protruding tongue, such that said protruding tongue is normally stressed towards the outer surface of said sleeve element at said opposite end, and once said handle is pressed towards the outer surface of said sleeve element, the protruding tongue moves around said hinge means such that the protruding tongue moves away from said outer surface of the sleeve element;
   wherein the sleeve element comprises a circumferential step that is formed between the hinge means and an end of the protruding tongue distal to the hinge means of each arm of the multi-armed circumferential array; and
   wherein the sleeve element further comprises a circumferential groove that is formed between the ends of said protruding tongues and the opposite end of said sleeve element, with the connector further comprising a ring gasket that is adapted for mounting inside said circumferential groove; and
   wherein the sleeve element is formed in a manner that once said sleeve element is mounted by pushing the sleeve element inside said passage that is formed in said bushing said circumferential step of said sleeve element is stressed towards said circumferential annular surface at the protruding end of said hollow stem section, the protruding tongue of each arm of the multi-armed circumferential array snaps into contact with said circumferential recess of said hollow stem section, and said ring gasket ensures the routing of water flow from inside the pipe through the passage formed in said sleeve element; and wherein the sleeve element is formed in a manner such that disassembly and detachment of the connector from said bushing is achieved by moving said the arms of the multi-armed circumferential array by pressing said handles in a movement around said hinge means until said protruding tongues are disconnected from contact with said circumferential recess, and then by pulling out said sleeve element from said passage formed in said bushing.

3. The connector according to claim 2 wherein said multi-armed circumferential array consists of two arms that are disposed opposite each other on both sides of said sleeve element.

4. The connector according to claim 2 wherein said hinge means is a living hinge that is formed as a unified, integral part with said sleeve element.

5. The connector according to claim 2 wherein said bushing is further characterized in that said bushing also comprises:

a hollow bracket that is formed around said passage that is formed along said hollow stem and as a continuation of said passage; wherein said hollow bracket is formed as a stepped cup having a bottom that protrudes towards the inside of said feeding pipe, and a cavity encompassed by sides and the bottom, with the sides having at least one opening to allow for the passage of water from said feeder pipe into the cavity of the hollow bracket; and a springy means that is adapted for mounting inside the cavity of said hollow bracket, wherein one end of said springy means is supported at the bottom of the hollow bracket and an other end of the springy means facing said passage formed along said hollow stem; and a moving element that is disc-shaped and which is sized for linear movement inside the cavity of said hollow bracket and inside said passage that is formed along the length of said hollow stem;

wherein said moving element is formed with a top surface that is adapted in its dimensions to an annular surface formed at the opposite end of said sleeve element that is opposite the bracket of the sleeve element, while leaving a flow passage in the contact area between the top surface of the moving element and the annular surface of the sleeve element;

wherein said moving element is additionally formed with a circumferential groove, and the connector additionally comprises a ring gasket that is adapted for mounting in said circumferential groove;

wherein said moving element is additionally formed with at least one tab, which protrudes from a bottom surface of the moving element and is adapted to snap into the at least one opening of the hollow bracket;

wherein said moving element is adapted for mounting inside said hollow bracket cavity, and to be normally stressed by said springy means to come into sealing contact with the passage that is formed along said hollow stem;

wherein the moving element is formed in such manner that once said sleeve element is mounted by pushing the sleeve element inside said passage that is formed in said bushing, the annular surface of the sleeve element pushes said moving element by contact with the top surface of the moving element to move against said springy means;

wherein a flow passage is formed between the annular surface on the opposite end of said sleeve element and the top surface of said moving element, the flow passage allowing the flow of water from said hollow bracket to said passage formed in said sleeve element; and wherein the moving element is formed in such manner that once the connector is disassembled and the sleeve element disconnected from said bushing, said moving element comes to form a sealing contact with said passage that is formed along said hollow stem and restricts the continued passage of water out of said feeding pipe.

6. The connector according to claim 5 wherein said springy means is a spiral spring.

7. The connector according to claim 5 wherein said passage, which remains in the contact area between the top surface of said moving element and said annular surface of the sleeve element, which is formed at the other end of said sleeve element, is formed by forming the top surface of said moving element or of the annular surface of said sleeve element in an undulating configuration.

8. The connector according to claim 5 wherein said hollow bracket is formed as a unified, integral part with said bushing.

9. The connector according to claim 1 wherein said bushing is additionally formed with a removable cover, which, prior to its removal and assembly of the connector, prevents water from flowing through said bushing.

10. The connector according to claim 1, wherein said multi-armed circumferential array that are formed in said sleeve element are formed at a bottom section of said sleeve element while extending from an outer surface of the sleeve element, and said sleeve element is further formed with a multi-opening circumferential array that is formed above said multi-armed circumferential array, providing for water passage between said passage of said bushing and said passage formed in said sleeve and wherein the arms of said multi-armed circumferential array are joined through a pushing knob that is central to the arms and is integrally formed with said sleeve while protruding from its bottom; and in a manner that once said sleeve element is mounted by pushing the sleeve element inside said passage that is formed in said bushing, said multi-armed circumferential array engage the walls of said passage that is formed in said bushing and then snapped into contact with the bottom surface of said bushing; and in a manner that disassembly of the connector and detachment of the sleeve element from said bushing is achieved by pushing said pushing knob, and then pushing said sleeve element, while by manually pressing on said pushing knob, said multi-armed circumferential array is elastically deflected while disconnecting of said multi-armed circumferential array from said bottom surface of said bushing, then pulling said sleeve element out of said passage that is formed in said bushing, in a linear movement.

11. The connector according to claim 1 wherein said feeder pipe is a lay-flat type of pipe.

12. The connector according to claim 11 wherein said lay-flat pipe wall is multi-layered.

13. The connector according to claim 1 wherein said bushing is formed by injection molding on said feeder pipe wall.

14. The connector according to claim 1 wherein said bushing is formed as a pre-prepared part fixed into said feeder pipe wall.

15. The connector according to claim 1 wherein said bushing is formed by combining injection molding on the feeder pipe wall with a pre-prepared part that is fixed to said feeder pipe wall.

16. The connector according to claim 1 wherein said bracket that is adapted for mounting a standard drip irrigation lateral connector is formed as an internal threaded section.

17. A feeder pipe that comprises an array of bushings, which are adapted for mounting the connectors according to claim 1.

18. An irrigation system that comprises a feeder pipe with drip irrigation lateral connectors according to claim 1, further comprising drip irrigation laterals that are mounted to said connectors by standard drip irrigation lateral connectors.

* * * * *